United States Patent
Wang et al.

(10) Patent No.: US 9,344,254 B2
(45) Date of Patent: May 17, 2016

(54) TWO OUTER LOOP LINK ADAPTATIONS FOR LEGACY USER EQUIPMENT

(75) Inventors: Yuanye Wang, San Diego, CA (US); Klaus Ingemann Pedersen, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 74 days.

(21) Appl. No.: 14/365,183

(22) PCT Filed: Dec. 15, 2011

(86) PCT No.: PCT/EP2011/072948
§ 371 (c)(1),
(2), (4) Date: Oct. 9, 2014

(87) PCT Pub. No.: WO2013/087113
PCT Pub. Date: Jun. 20, 2013

(65) Prior Publication Data
US 2015/0036602 A1 Feb. 5, 2015

(51) Int. Cl.
*H04W 72/12* (2009.01)
*H04L 5/00* (2006.01)
*H04L 1/00* (2006.01)
*H04W 84/04* (2009.01)

(52) U.S. Cl.
CPC .............. *H04L 5/006* (2013.01); *H04L 1/0026* (2013.01); *H04L 1/0035* (2013.01); *H04W 72/1226* (2013.01); *H04W 84/045* (2013.01)

(58) Field of Classification Search
None
See application file for complete search history.

(56) References Cited

U.S. PATENT DOCUMENTS

| 2006/0093024 A1 | 5/2006 | Pietraski et al. .............. 375/220 |
| 2008/0240216 A1 | 10/2008 | Kolding et al. .............. 375/227 |
| 2010/0284454 A1* | 11/2010 | Oteri ................... H03M 13/353 375/224 |

(Continued)

FOREIGN PATENT DOCUMENTS

| WO | WO2008004052 A2 | 1/2008 |
| WO | WO2011130453 A1 | 10/2011 |

OTHER PUBLICATIONS

NTT DOCOMO, Remaining issues on eICIC for Rel-10, R1-106184, 3GPP TSG RAN WG1 Meeting #63, Jacksonville, USA, Nov. 15-19, 2010, pp. 1-6.*

(Continued)

*Primary Examiner* — Benjamin Lamont
(74) *Attorney, Agent, or Firm* — Harrington & Smith

(57) ABSTRACT

A base station determines first quality information indicative for a quality of a first part of subframes of a communication channel and a second quality information indicative for a quality of a second part of the subframes of the communication channel. Feedback information is received from a UE being indicative for the quality of the communication channel. A first compensation value is determined based on the first quality information and the feedback information, wherein the compensation value compensates a difference between the first quality information and the feedback information. A second compensation value is determined based on the second quality information and the feedback information, wherein the compensation value compensates a difference between the second quality information and the feedback information. The feedback information is adjusted based on the determined first and second compensation values. The communication channel is configured based on the adjusted feedback information.

20 Claims, 4 Drawing Sheets

(56) References Cited

U.S. PATENT DOCUMENTS

| | | | |
|---|---|---|---|
| 2011/0249643 A1* | 10/2011 | Barbieri | H04L 1/0026 370/329 |
| 2012/0076025 A1* | 3/2012 | Barbieri | H04L 5/0023 370/252 |
| 2013/0194940 A1* | 8/2013 | Li | H04J 11/0023 370/252 |
| 2014/0170985 A1* | 6/2014 | Raghavan | H04W 24/08 455/67.13 |
| 2015/0049703 A1* | 2/2015 | Nobukiyo | H04L 5/0057 370/329 |
| 2015/0156656 A1* | 6/2015 | Raghavan | H04W 24/08 370/252 |

OTHER PUBLICATIONS

3GPP TSG RAN WG1 Meeting #63; "Discussion on CRS interference and CSI measurements in macrapico deployment"; Jacksonville, United States; Nov. 15-19, 2010; R1-105969; 4 pgs.

* cited by examiner

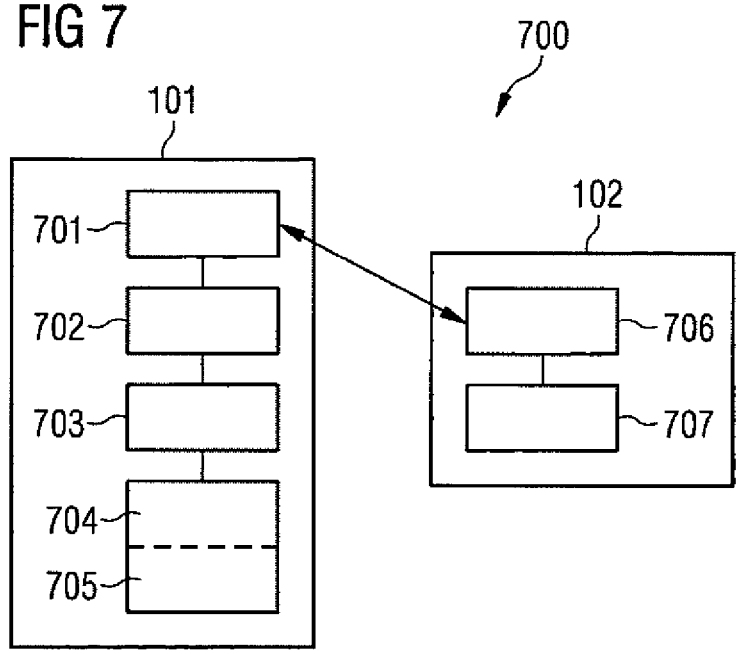

TWO OUTER LOOP LINK ADAPTATIONS FOR LEGACY USER EQUIPMENT

FIELD OF THE INVENTION

The present invention relates to the field of cellular communication networks and in particular to cellular communication networks using time domain enhanced inter-cell interference coordination.

BACKGROUND OF THE INVENTION

In the field of LTE, heterogeneous networks (HetNet) are used. A HetNet is composed by deploying small base stations in an existing macro-cell network. It can boost the system capacity and satisfy high user equipment (UE) traffic demand, but may cause severe interference to UEs. For instance, a macro-UE close to a Home eNB (HeNB) or a pico-UE close to a macro-eNB can hardly be served due to the heavy interference. Time Domain (TDM) enhanced Inter-Cell Interference-Coordination (eICIC) may be used to offer protection to these victim UEs. It may prevent some base stations from having data transmission in certain subframes, and hence may improve the channel condition of the victim UEs. These subframes are referred to as the Almost Blank Subframes (ABS), and the rest are normal subframes, known as non-ABS. A drawback of TDM eICIC is that the interference will change dramatically in time domain, depending on the muting pattern.

Further, Outer Loop Link Adaptation (OLLA) may be used in the base station for the link adaptation and packet scheduling process. It adjusts the Channel Quality Indicator (CQI) report based on information received by the UE. By doing so, OLLA may better align the CQI report with the actual channel condition, and may help control the Block Error Rate (BLER) for first transmissions even with imperfect CQI information.

According to 3GPP, UEs in a HetNet with TDM eICIC should be configured with separate CQI measurements for ABS and non-ABS. This guarantees the receiver side BLER performance, but is not supported by the legacy (i.e. old) UEs. The legacy UEs have to follow one CQI measurement pattern, and the estimated interference is averaged in time domain across a certain time window. Therefore, the interference variation due to TDM eICIC is not directly reflected in the CQI report of the legacy UEs. If the conventional OLLA is applied, a very high OLLA offset should be used to satisfy the BLER target. This prevents the legacy UEs from benefiting from TDM eICIC, and causes poorer spectral efficiency.

In view of the above-described situation, there exists a need for an improved technique that provides a cellular communication system substantially avoiding or at least reducing one or more of the above-identified problems. Hence, a system or method being able to provide efficient and improved configuration of a communication channel may be needed.

SUMMARY OF THE INVENTION

This need may be met by the subject matter according to the independent claims. Advantageous embodiments of the herein disclosed subject matter are described by the dependent claims.

According to a first aspect of the herein disclosed subject matter, there is provided a method for configuring a communication channel for a radio transmission within a cellular network between a user equipment and a base station. The communication channel is divided into subframes. The cellular network comprises a further base station, wherein the further base station is adapted to use a further communication channel. The further communication channel is divided into subframes, wherein a first part of the subframes of the communication channel is associated in time with a first part of the subframes of the further communication channel, which is unscheduled by the further base station due to a predefined muting pattern, and wherein a second part of the subframes of the communication channel is associated in time with a second part of the subframes of the further communication channel, which is scheduled by the further base station. The method comprises determining, by the base station, a first quality information being indicative for a quality of the first part of the subframes of the communication channel and a second quality information being indicative for a quality of the second part of the subframes of the communication channel, receiving, by the base station, a feedback information from the user equipment being indicative for the quality of the communication channel, determining a first compensation value based on the first quality information and the feedback information, wherein the compensation value is adapted for compensating a difference between the first quality information and the feedback information, and a second compensation value based on the second quality information and the feedback information, wherein the compensation value is adapted for compensating a difference between the second quality information and the feedback information, adjusting the feedback information based on the determined first compensation value and based on the determined second compensation value, and configuring the communication channel based on the adjusted feedback information.

This aspect may relate in particular to the field of heterogeneous networks (HetNet) and Outer Loop Link Adaptation (OLLA). As described above, UEs in a HetNet with TDM eICIC should be configured with separate CQI measurements for ABS and non-ABS. This guarantees the receiver side BLER performance, but is not supported by the legacy (i.e. old) UEs. The legacy UEs have to follow one CQI measurement pattern, and the estimated interference is averaged in time domain across a certain time window. Therefore, the interference variation due to TDM eICIC is not directly reflected in the CQI report of the legacy UEs. If the conventional OLLA is applied, a very high OLLA offset should be used to satisfy the BLER target. This prevents the legacy UEs from benefiting from TDM eICIC, and causes at the same time poorer spectral efficiency.

Hence, the basic idea of the present invention is to provide a method being able to provide a method being able to modify the basic OLLA configuration to satisfy the BLER target and maintain high spectral efficiency. It may especially apply for UEs who cannot measure the CQI for ABS/non-ABS separately. According to the described method, in a HetNet scenario with TDM eICIC, the base station may use two separate OLLAs (dual-OLLA) for each legacy UE, one for ABS and one for non-ABS.

The terms "muted subframes" and "un-muted subframes" in this context may refer to ABS and non-ABS subframes as described above. During ABS, there is no or less reduced interference from a neighbor base station (in this case the further base station) as this base station does not schedule specific subframes. During ABS, only information necessary for controlling a communication channel may be transmitted.

As described, the user equipment, which may be a user equipment of an older technology not supporting channel measurements in dependence of ABS and non-ABS, may determine the feedback information as an average or non-time dependent information, without considering different interference levels during ABS and non-ABS. To neutralize (at least partially) the disadvantages, an algorithm may be used for determining a first and a second compensation value based on the (average) feedback information and on the first quality information for ABS and on the second quality information for non-ABS.

The base station may be any kind of base station or eNodeB (eNB) being able to provide the above mentioned functionalities. The user equipment may be a regular LTE device, in particular not supporting separate measurements for ABS and non-ABS, being able to communicate with the base station.

The term "associated in time" may denote any kind of relation between subframes of the communication channel and the further communication channel. The relation may be equal in time or shifted in time.

According to an embodiment of the invention, the first quality information, the second quality information and/or the feedback information correspond to a channel quality indicator.

Channel Quality Indicator (CQI) is a measurement of the communication quality of wireless channels. CQI can be a value (or values) representing a measure of channel quality for a given channel. Typically, a high value CQI is indicative of a channel with high quality and vice versa. The CQI for the first quality information, the second quality information and/or the feedback information may be computed by making use of performance metric, such as a signal-to-noise ratio (SNR), signal-to-interference plus noise ratio (SINR), signal-to-noise plus distortion ratio (SNDR), of the channel. These values and others may be measured for the communication channel and may then used to compute a CQI for the channel.

According to a further embodiment of the invention, determining the first quality information and/or the second quality information comprises determining a packet reception status.

The quality information, i.e. the CQI of the ABS and the non-ABS may be determined based on the packet reception status, i.e., the CQI will be increased if an "ACK" is received, otherwise it will be decreased.

According to a further embodiment of the invention, the method further comprises determining, by the user equipment, the feedback information by determining a packet reception status.

The UE may determine the feedback information being indicative for the quality of the communication channel, i.e. the CQI of the communication channel, in the following way.

The UE may measure the downlink quality. Based on that measurement, it may send a CQI back to the base station. The base station may use this CQI, i.e. the feedback information, when it transmits data to the UE in the downlink to determine the modulation and coding scheme to be used. After each data transmission, the base station receives Ack/Nack from the UE, so the base station may know if the transmission was successful. Thus, based on the received Ack/Nack's, the base station may determine how much it needs to offset the received CQI from the UE when deciding the modulation and coding scheme used for the downlink transmission. This CQI offset corresponds to the OLLA offset as mentioned above.

Hence, it may determine the quality based on the packet reception status, i.e., the CQI will be increased if an "ACK" is received, otherwise it will be decreased. In contrast to the base station, the UE may determine the CQI as an average value without considering a difference between ABS and non-ABS, in particular a difference of interferences during ABS and non-ABS.

According to a further embodiment of the invention, the method comprises, before determining the first quality information and the second quality information, determining whether the user equipment determines the feedback information for the first part of the subframes and the second part of the subframes separately.

In case the UE determines the feedback information not under consideration of ABS and non-ABS but as an average information, the base station may use two separate algorithms for determining the compensation values for the first part of the subframes and the second part of the subframes.

According to a further embodiment of the invention, the first compensation value is determined during a first outer loop link adaptation (OLLA).

The OLLA algorithm may be used to compensate the CQI/SINR gap between UE's feedback and real channel condition based on eNB's observation/statistics. Such gap includes some system error, e.g. feedback delay, CQI quantization error, etc. The OLLA algorithm determines a compensation value, i.e. an offset, for compensating this gap and configuring the communication channel based on this compensation value (i.e., the adjusted first quality information). The CQI compensation will be like CQI_New=CQI_Feedback−OLLA_Offset.

The eNB may set an initial value for OLLA-offset and afterwards close-loop iterative operation of OLLA will make the OLLA-offset converge. For example assuming OLLA-offset initial value is zeros: then at the beginning phase, the real channel condition may be better than the CQI which UE feeds back. In this case, ACK will occur with much higher probability then NACK, so the OLLA_Offset might keep at one negative level, e.g. −5 or −3.

According to a further embodiment of the invention, the second compensation value is determined during a second outer loop adaptation (OLLA).

The base station may use two separate OLLA algorithms for determining the compensation value and adapting the CQI report, one for ABS and the other for non-ABS. Thus, the difference based on the non-consideration of ABS and non-ABS by the UE may be compensated and the associated problems may be avoided.

According to a further embodiment of the invention, configuring the communication channel comprises scheduling a packet transmission between the base station and the user equipment.

The determined quality information and the adjusted feedback information may be used to schedule packet transmission based on the now known channel condition.

According to a further embodiment of the invention, scheduling the packet transmission between the base station and the user equipment comprises configuring the first part of the subframes based on the adjusted feedback information and configuring the second part of the subframes based on the adjusted feedback information.

According to this embodiment, the communication channel may be configured separately for the ABS and the non-ABS based on the adjusted feedback information. Here, it may be considered during configuration of the first part of the subframes and the second part of the subframes that these parts have different interference levels.

According to a second aspect of the invention, a base station for configuring a communication channel for a radio transmission within a cellular network between a user equipment and the base station is provided. The communication channel is divided into subframes, wherein the cellular network comprises a further base station, wherein the further base station is adapted to use a further communication channel, wherein the further communication channel is divided into subframes, wherein a first part of the subframes of the communication channel is associated in time with a first part of the subframes of the further communication channel, which is unscheduled by the further base station due to a predefined muting pattern, and wherein a second part of the subframes of the communication channel is associated in time with a second part of the subframes of the further communication channel, which is scheduled by the further base station. The base station comprises a determination unit being adapted to determine a first quality information being indicative for a quality of the first part of the subframes of the communication channel and a second quality information being indicative for a quality of the second part of the subframes of the communication channel, a receiving unit being adapted to receive a feedback information from the user equipment being indicative for the quality of the communication channel, a further determination unit being adapted to determine a first compensation value based on the first quality information and the feedback information, wherein the compensation value is adapted for compensating a difference between the first quality information and the feedback information, and a second compensation value based on the second quality information and the feedback information, wherein the compensation value is adapted for compensating a difference between the second quality information and the feedback information, an adjusting unit being adapted to adjust the feedback information based on the determined first compensation value and based on the determined second compensation value, and a configuration unit being adapted to configure the communication channel based on the adjusted feedback information.

The base station may be any type of access point or point of attachment, which is capable of providing a wireless access to a cellular network system. Thereby, the wireless access may be provided for a user equipment or for any other network element, which is capable of communicating in a wireless manner. The base station may be an eNodeB, eNB, home NodeB or HNB, or any other kind of access point.

The base station may comprise a receiving unit, for example a receiver as known by a skilled person. The base station may also comprise a transmitting unit, for example a transmitter. The receiver and the transmitter may be implemented as one single unit, for example as a transceiver. The transceiver or the receiving unit and the transmitting unit may be adapted to communicate with a further base station or the user equipment via an antenna.

The determination unit and the further determination unit may be implemented as single units or may be one unit being implemented for example as part of a standard control unit, like a CPU or a microcontroller. Further, the adjusting unit and the configuration unit as well as the determination unit and the further determination unit may be implemented as single units or may be implemented as one unit being implemented for example as part of a standard control unit, like a CPU or a microcontroller.

A user equipment (UE) in the context of this description may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station.

The user equipment may further comprise a transmitting unit for transmitting signals. The transmitting unit may be a transmitter as known by a skilled person. The receiver and the transmitting unit may be implemented as one single unit, for example as a transceiver. The transceiver or the receiver and the transmitting unit may be adapted to communicate with the base station via an antenna. The user equipment may further comprise a measuring unit for measuring and determining the feedback information to be transmitted to the base station.

According to a third aspect of the invention, a cellular network system for configuring a communication channel for a radio transmission between a user equipment and a base station is provided. The cellular network system comprises a base station as described above.

Generally herein, the method and embodiments of the method according to the first aspect may include performing one or more functions described with regard to the second or third aspect or an embodiment thereof. Vice versa, the base station or cellular network system and embodiments thereof according to the second and third aspect may include units or devices for performing one or more functions described with regard to the first aspect or an embodiment thereof.

According to a fourth aspect of the herein disclosed subject-matter, a computer program for configuring a communication channel for a radio transmission between a user equipment and a base station, is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a cellular network system, a base station and a method of configuring a communication channel for a radio transmission between a user equipment and a base station. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless other notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are appar-

BRIEF DESCRIPTION OF THE DRAWINGS

FIG. 7 shows a base station and a user equipment within a cellular network system according to an exemplary embodiment of the invention.

It is noted that in different figures, similar or identical elements are provided with the same reference signs.

DETAILED DESCRIPTION

In the following, embodiments of the herein disclosed subject matter are illustrated with reference to the drawings and reference to aspects of current standards, such as LTE. However, such reference to current standards is only exemplary and should not be considered as limiting the scope of the claims.

Figure 1:
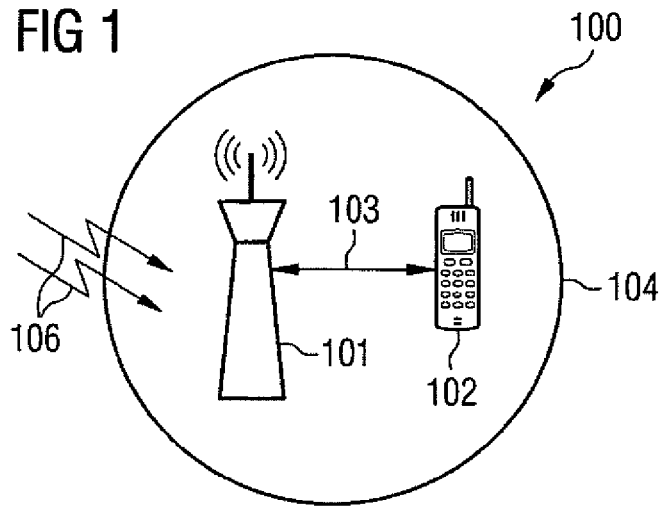
FIG. 1 shows a cellular network system according to an exemplary embodiment of the invention.

FIG. 1 shows a cellular network system 100 according to an exemplary embodiment. The cellular network system comprises at least one cell 104. The cellular network system comprises a base station 101 and a user equipment 102 being assigned to the cell. The base station and the user equipment are adapted to communicate with each other via a communication channel 103.

The communication channel may be affected by a further communication channel provided by a further base station causing interferences 106. In order to reduce the interferences caused by the further communication channel, TDM eICIC may be used. Therefore, the further communication channel is divided into subframes, wherein a first part of the subframes of the communication channel 103 is associated in time with a first part of the subframes of the further communication channel, which is unscheduled by the further base station due to a predefined muting pattern (almost blank subframes, ABS). A second part of the subframes of the communication channel 103 is associated in time with a second part of the subframes of the further communication channel, which is scheduled by the further base station (non-ABS).

However, when a user equipment (UE) 102 is used which is not able to determine a feedback information being indicative for the quality of the communication channel under consideration of ABS and non-ABS. The following method may be used.

The base station determines a first quality information (in particular a quality channel indicator, CQI_real) being indicative for a quality of the first part of the subframes of the communication channel, related to ABS and a second quality information (CQI_real) being indicative for a quality of the second part of the subframes of the communication channel, related to non-ABS. The base station further receives a feedback information from the user equipment being indicative for the quality of the communication channel (CQI_feedback). The feedback information is an average or not time dependent value without consideration of different interferences between ABS and non-ABS.

The base station determines a first compensation value based on the first quality information and the feedback information, wherein the compensation value is adapted for compensating a difference between the first quality information and the feedback information, and a second compensation value based on the second quality information and the feedback information, wherein the compensation value is adapted for compensating a difference between the second quality information and the feedback information. The base station further adjusts the feedback information based on the determined first compensation value and based on the determined second compensation value. Thus, the base station may use a first outer loop link adaptation (OLLA) algorithm for ABS and a second OLLA for non-ABS. Based on this, the base station may configure the communication channel.

This method is related in particular to Outer Loop Link Adaptation (OLLA) configurations in the heterogeneous network (HetNet) scenarios with Time Domain (TDM) enhanced Inter-Cell Interference-Coordination (eICIC). OLLA may be used in the base station for the link adaptation and packet scheduling process. It adjusts the Channel Quality Indicator (CQI) report based on the packet reception status, i.e., the CQI will be increased if an "ACK" is received, otherwise it will be decreased. By doing so, OLLA better aligns the CQI report with the actual channel condition, and helps control the Block Error Rate (BLER) for first transmissions even with imperfect CQI information.

According to 3GPP, UEs in a HetNet with TDM eICIC should be configured with separate CQI measurement for ABS and non-ABS. This may guarantee the receiver side BLER performance, but is not supported by the legacy UEs. The legacy UEs have to follow one CQI measurement pattern, and the estimated interference is averaged in time domain across a certain time window. Therefore, the interference variation due to TDM eICIC is not directly reflected in the CQI report of the legacy UEs. If the normal OLLA is applied, a very high OLLA offset should be used to satisfy the BLER target. This prevents the legacy UEs from benefiting from TDM eICIC. However, this results in poorer spectral efficiency.

Figure 2:
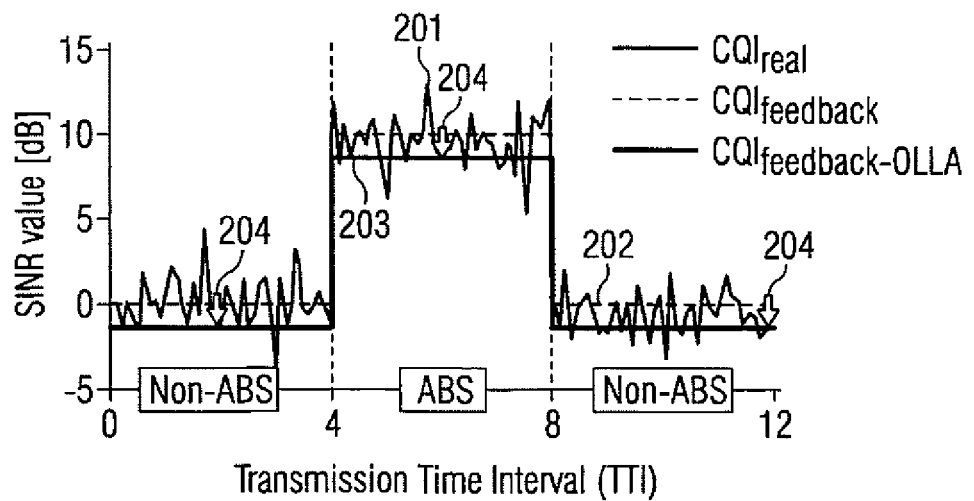
FIG. 2 shows CQIs of user equipments with separate measurements for ABS and non-ABS.

An example of using OLLA to align between reported, i.e. feedback information from the UE, 202 and actual CQI, as determined by the base station, 201 is shown in FIG. 2. Using OLLA, the CQI can be adjusted (203). For LTE-Advanced UEs as shown in FIG. 2, a small OLLA offset 204 is enough to guarantee BLER while achieving high spectral efficiency.

Figure 3:
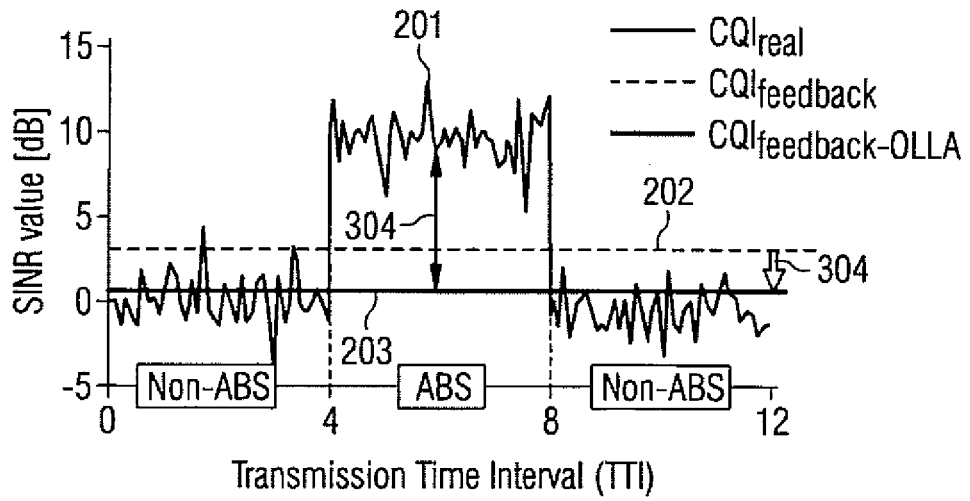
FIG. 3 shows CQIs of user equipments with one measurement for ABS and non-ABS.

However, for the LTE-legacy UEs as shown in FIG. 3, due to the time averaging of the interference, the reported CQI 202 is roughly constant in time domain. A high OLLA offset 304 may be required to reduce the BLER in non-ABS. At the same time, it limits the achievable spectral efficiency in ABS.

Thus, as described in the context of FIG. 1, an OLLA configuration may be used for the legacy UEs who do not support separate CQI measurement for muted and un-muted subframes. As described, the base station may use two separate OLLAs (dual-OLLA) for each legacy UE, one for ABS and one for non-ABS.

Figure 4:
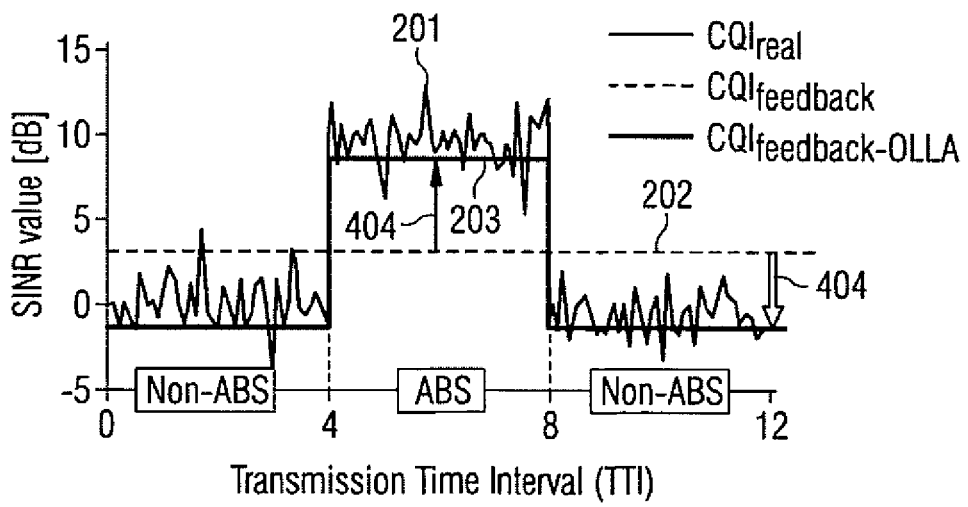
FIG. 4 shows CQIs of user equipments with one measurement for ABS and non-ABS according to an exemplary embodiment of the invention.

The OLLA algorithm may be performed in the base station and might not require special UE support. FIG. 4 shows an example of CQIs of user equipments with one measurement for ABS and non-ABS according to an exemplary embodiment of the invention. By using two OLLAs, the reported CQI 202 can be better matched with the actual channel condition in both ABS and non-ABS, i.e. the OLLA offset 404 may be adjusted depending whether it is ABS or non-ABS. Therefore, the BLER can be maintained and high spectral efficiency can be achieved.

Figure 5:
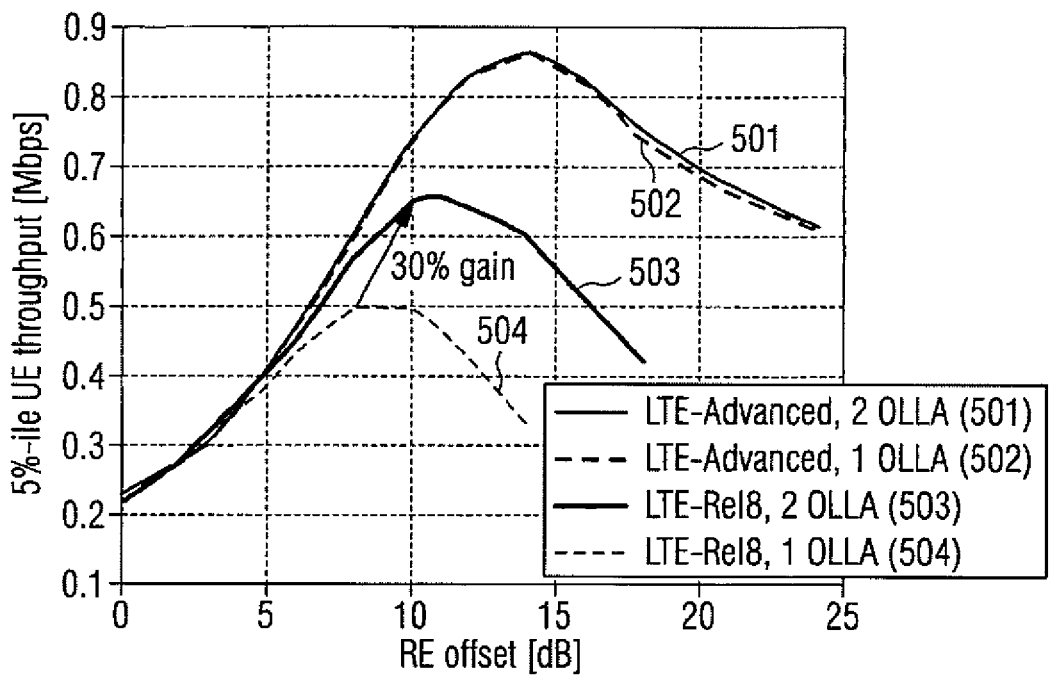
FIG. 5 shows a comparison of user equipment throughputs according to FIGS. 2, 3 and 4.
Figure 6:
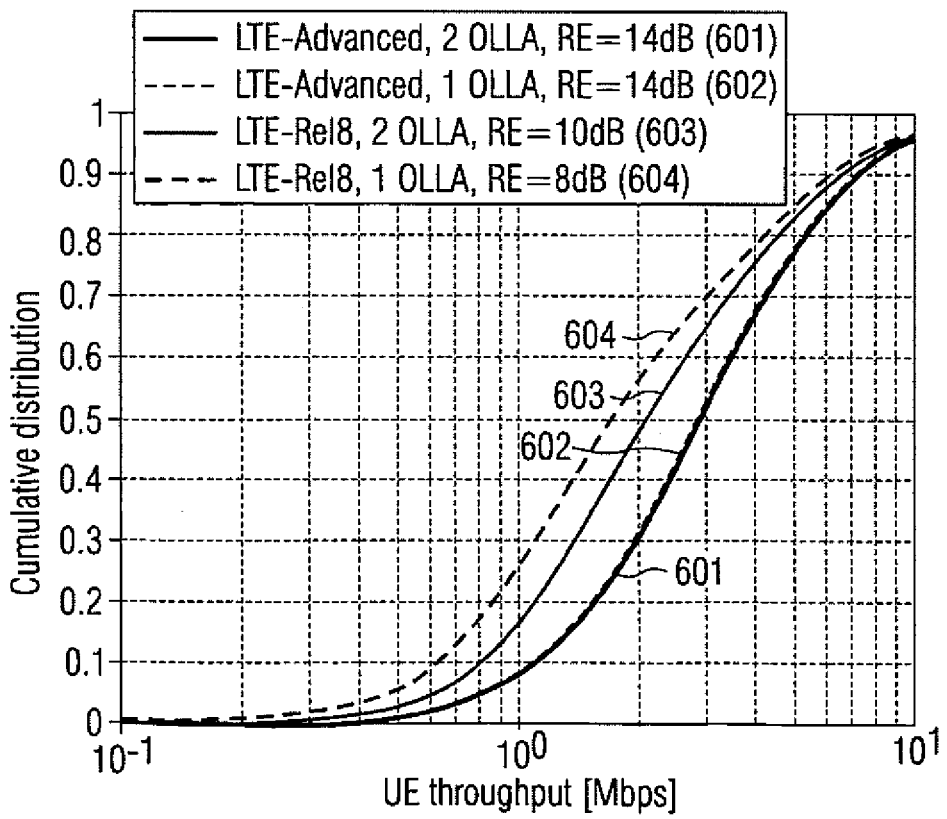
FIG. 6 shows a cumulative distribution function of the user equipment throughputs of FIG. 5.

FIG. 5 shows a comparison of user equipment throughputs according to FIGS. 2, 3 and 4. It illustrates the 5%-ile UE throughput in a HetNet scenario, which is composed with 4 pico-eNBs per macro-sector. The macro-layer is muted 50% of the times, and different Range Extension (RE) offsets are configured for the pico-eNB, which tunes the load between the two network layers to maximize the system performance. As can be seen from this figure, dual-OLLA does not benefit the LTE-Advanced UEs (501 showing a UE with separate measurements for ABS and non-ABS in combination with two OLLA and 502 showing a UE with separate measurements for ABS and non-ABS in combination with one OLLA), because for these UEs, the gap between reported and actual CQI is similar in ABS and non-ABS. For the legacy UEs (503 showing a UE with one measurement for ABS and non-ABS in combination with two OLLA and 504 showing a UE with one measurement for ABS and non-ABS in combination with one OLLA), the proposed dual-OLLA configuration allows them to benefit from TDM eICIC, and a higher RE offset can be supported. Overall, 30% gain is obtained in 5%-ile UE throughput. The Cumulative Distribution Function (CDF) of UE throughput is plotted in FIG. 6. It shows that dual-OLLA is not necessary for the LTE-Advanced UEs (601 showing a UE with separate measurements for ABS and non-ABS in combination with two OLLA and 602 showing a UE with separate measurements for ABS and non-ABS in combination with one OLLA). For the legacy UEs (603 showing a UE with one measurement for ABS and non-ABS in combination with two OLLA and 604 showing a UE with one measurement for ABS and non-ABS in combination with one OLLA), dual-OLLA may improve the performance for all UEs. Note that for pico-UEs, the gain may result from the better alignment between the reported and actual CQI; for macro-UEs, the gain may result from the high pico-layer RE offset, which is possible when dual-OLLA is used.

FIG. 7 shows a cellular network system 700 according to an exemplary embodiment of the invention. The cellular network system comprises a base station 101 and a user equipment 102.

The base station 101 may be any type of access point or point of attachment, which is capable of providing a wireless access to a telecommunication network. Thereby, the wireless access may be provided for a user equipment 102 or for any other network element, which is capable of communicating in a wireless manner.

The base station comprises a receiver as known by a skilled person. The base station may also comprise a transmitter. The receiver and the transmitter may be implemented as one single unit, for example as a transceiver 701 as shown in FIG. 7. The transceiver or the receiving unit and the transmitter may be adapted to communicate with a further base station (not shown) or the user equipment 102 via an antenna. The receiver may receive a feedback information from the user equipment being indicative for the quality of the communication channel.

The base station 101 comprises further a determination unit 704 being adapted to determine a first quality information being indicative for a quality of the first part of the subframes of the communication channel and a second quality information being indicative for a quality of the second part of the subframes of the communication channel. The base station comprises a further determination unit 705 being adapted to determine a first compensation value based on the first quality information and the feedback information, wherein the compensation value is adapted for compensating a difference between the first quality information and the feedback information, and a second compensation value based on the second quality information and the feedback information, wherein the compensation value is adapted for compensating a difference between the second quality information and the feedback information. The determination unit and the further determination unit may be implemented as one unit or may be implemented as single units.

Furthermore, the base station comprises an adjusting unit 702 being adapted to adjust the feedback information based on the determined first compensation value and based on the determined second compensation value. In addition, the base station comprises a configuration unit 703 being adapted to configure the communication channel based on the adjusted feedback information.

The adjusting unit and the configuration unit may be part of one integrated unit or may single units. They may also be part of a common control unit of the base station. These units may also be implemented as one single unit together with the determination unit and the further determination unit.

The user equipment (UE) 102 may be any type of communication end device, which is capable of connecting with the described base station. The UE may be in particular a cellular mobile phone, a Personal Digital Assistant (PDA), a notebook computer, a printer and/or any other movable communication device.

The user equipment 102 may comprise a transceiver 706 for transmitting and/or receiving signals to/from the base station 101. The transceiver may comprise a transmitting unit and a receiving unit. The transmitting unit may be a transmitter as known by a skilled person, and the receiving unit may be a common known receiver. The transceiver or the receiving and the transmitting unit may be adapted to communicate with the base station via an antenna.

The user equipment 102 may further comprise a measuring or determination unit 707 being adapted to measure or determine the feedback information. The measuring unit may be integrated with the transceiver or may be a single unit. It may also be part of a common control unit of the user equipment.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a base station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the configuration unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularity on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps. It may also be possible in further refinements of the invention to combine features from different embodiments described herein above. It should also be noted that reference signs in the claims should not be construed as limiting the scope of the claims.

LIST OF REFERENCE SIGNS

100 Cellular network system
101 Base station
102 User equipment
103 Communication channel
104 Cell
106 Interferences caused by further communication channel
201 CQI of base station (real CQI)
202 CQI of user equipment (feedback CQI)
203 adjusted CQI (feedback CQI-OLLA)
204 OLLA offset
304 OLLA offset
404 OLLA offset
501 UE with separate measurements for ABS and non-ABS in combination with two OLLA
502 UE with separate measurements for ABS and non-ABS in combination with one OLLA
503 UE with one measurement for ABS and non-ABS in combination with two OLLA
504 UE with one measurement for ABS and non-ABS in combination with one OLLA
601 UE with separate measurements for ABS and non-ABS in combination with two OLLA
602 UE with separate measurements for ABS and non-ABS in combination with one OLLA
603 UE with one measurement for ABS and non-ABS in combination with two OLLA
604 UE with one measurement for ABS and non-ABS in combination with one OLLA
700 Cellular network system
701 Transceiver
702 Adjusting unit
703 Configuration unit
704 Determination unit
705 Further determination unit
706 Transceiver
707 Measuring unit

The invention claimed is:

1. A method comprising:
by a base station operating in a communication channel in a cellular network comprising the base station and a further base station adapted to use a further communication channel, wherein the communication channel is divided into subframes, wherein a first part of the subframes of the communication channel is associated in time with a first part of the subframes of the further communication channel, which is unscheduled by the further base station due to a predefined muting pattern, and wherein a second part of the subframes of the communication channel is associated in time with a second part of the subframes of the further communication channel, which is scheduled by the further base station, determining first quality information indicative of the quality of the first part of the subframes of the communication channel and second quality information indicative of the quality of the second part of the subframes of the communication channel;
receiving, by the base station, feedback information from the user equipment being indicative for the quality of the communication channel;
determining a first compensation value based on the first quality information and the feedback information, wherein the first compensation value is adapted for compensating a difference between the first quality information and the feedback information, and a second compensation value based on the second quality information and the feedback information, wherein the second compensation value is adapted for compensating a difference between the second quality information and the feedback information,
adjusting the feedback information based at least in part on the determined first compensation value and the determined second compensation value, and
configuring the communication channel based on the adjusted feedback information.

2. The method as set forth in claim 1, wherein the first quality information, the second quality information and/or the feedback information correspond to a channel quality indicator.

3. The method as set forth in claim 1, wherein determining the first quality information and/or the second quality information comprises determining a packet reception status.

4. The method as set forth in claim 1, the method further comprises determining, by the user equipment, the feedback information by determining a packet reception status.

5. The method as set forth in claim 1, the method comprising, before determining the first quality information and the second quality information, determining whether the user equipment determines the feedback information for the first part of the subframes of the communication channel and the second part of the subframes of the communication channel separately.

6. The method as set forth in claim 1, wherein the first compensation value is determined during a first outer loop link adaptation.

7. The method as set forth in claim 1, wherein the second compensation value is determined during a second outer loop adaptation.

8. The method as set forth in claim 1, wherein configuring the communication channel comprises scheduling a packet transmission between the base station and the user equipment.

9. The method as set forth in claim 1, wherein scheduling the packet transmission between the base station and the user equipment comprises configuring the first part of the subframes of the communication channel based on the adjusted feedback information and configuring the second part of the subframes of the communication channel based on the adjusted feedback information.

10. A base station comprising:
at least one processor;
memory storing a program of instructions;

wherein the memory storing the program of instructions is configured to, with the at least one processor, cause the base station to at least:

during operation in a communication channel in a cellular network comprising the base station and a further base station adapted to use a further communication channel, wherein the communication channel is divided into subframes, wherein a first part of the subframes of the communication channel is associated in time with a first part of the subframes of the further communication channel, which is unscheduled by the further base station due to a predefined muting pattern, and wherein a second part of the subframes of the communication channel is associated in time with a second part of the subframes of the further communication channel, which is scheduled by the further base station, determine first quality information indicative of the quality of the first part of the subframes of the communication channel and second quality information indicative of the quality of the second part of the subframes of the communication channel, receive feedback information from the user equipment indicative of the quality of the communication channel, determine a first compensation value based on the first quality information and the feedback information, wherein the first compensation value is adapted for compensating a difference between the first quality information and the feedback information, and a second compensation value based on the second quality information and the feedback information, wherein the second compensation value is adapted for compensating a difference between the second quality information and the feedback information, adjust the feedback information based at least in part on the determined first compensation value and the determined second compensation value, and configure the communication channel based on the adjusted feedback information.

11. The base station as set forth in claim 10, wherein the first quality information, the second quality information and/or the feedback information correspond to a channel quality indicator.

12. The base station as set forth in claim 10, wherein determining the first quality information and/or the second quality information comprises determining a packet reception status.

13. The base station as set forth in claim 10, wherein the base station is further caused to, before determining the first quality information and the second quality information, determine whether the user equipment determines the feedback information for the first part of the subframes of the communication channel and the second part of the subframes of the communication channel separately.

14. The method as set forth in claim 10, wherein the first compensation value is determined during a first outer loop link adaptation.

15. A non-transitory computer readable medium storing a program of instructions, execution of which by at least one processor configures an apparatus to at least:

control a base station to, during operation in a communication channel in a cellular network comprising the base station and a further base station adapted to use a further communication channel, wherein the communication channel is divided into subframes, wherein a first part of the subframes of the communication channel is associated in time with a first part of the subframes of the further communication channel, which is unscheduled by the further base station due to a predefined muting pattern, and wherein a second part of the subframes of the communication channel is associated in time with a second part of the subframes of the further communication channel, which is scheduled by the further base station, determine first quality information indicative of the quality of the first part of the subframes of the communication channel and second quality information indicative of the quality of the second part of the subframes of the communication channel, control the base station to receive feedback information from the user equipment indicative of the quality of the communication channel, control the base station to determine a first compensation value based on the first quality information and the feedback information, wherein the first compensation value is adapted for compensating a difference between the first quality information and the feedback information, and a second compensation value based on the second quality information and the feedback information, wherein the second compensation value is adapted for compensating a difference between the second quality information and the feedback information, control the base station to adjust the feedback information based at least in part on the determined first compensation value and the determined second compensation value, and control the base station to configure the communication channel based on the adjusted feedback information.

16. The computer readable medium as set forth in claim 15, wherein the first quality information, the second quality information and/or the feedback information correspond to a channel quality indicator.

17. The computer readable medium as set forth in claim 15, wherein determining the first quality information and/or the second quality information comprises determining a packet reception status.

18. The computer readable medium as set forth in claim 15, wherein the base station is further caused to, before determining the first quality information and the second quality information, determine whether the user equipment determines the feedback information for the first part of the subframes of the communication channel and the second part of the subframes of the communication channel separately.

19. The computer readable medium as set forth in claim 15, wherein the first compensation value is determined during a first outer loop link adaptation.

20. The computer readable medium as set forth in claim 15, wherein the second compensation value is determined during a second outer loop adaptation.

* * * * *